United States Patent [19]
Schroeder et al.

[11] Patent Number: 4,913,921
[45] Date of Patent: Apr. 3, 1990

[54] FOOD PRODUCTS CONTAINING FISH OILS STABILIZED WITH FRUCTOSE

[75] Inventors: Lisa R. Schroeder, Brooklyn Park; Dorothy J. Muffett, Bloomington, both of Minn.

[73] Assignee: General Mills, Inc., Minneapolis, Minn.

[21] Appl. No.: 95,181

[22] Filed: Sep. 11, 1987

[51] Int. Cl.$^4$ ............................................. A23D 5/00
[52] U.S. Cl. ..................................... 426/321; 426/330; 426/334; 426/330.6; 426/541; 426/602; 426/613
[58] Field of Search ..................... 426/321, 330, 330.6, 426/544, 601, 602, 603, 604, 613, 605, 334, 541

[56] References Cited
U.S. PATENT DOCUMENTS 4,363,823 12/1982 Kimura et al. ................. 426/613 X
4,461,777 7/1984 Murase et al. .................. 426/602 X
4,637,937 1/1987 Terada et al. .................. 426/602 X

*Primary Examiner*—Donald E. Czaja
*Assistant Examiner*—Celine T. Callahan
*Attorney, Agent, or Firm*—Dorsey & Whitney

[57] ABSTRACT

Disclosed are food products, especially stable emulsions such as salad dressings, which contain non-hydrogenated fish oil yet which exhibit enhanced stability of the fish oil against flavor degradation. The improved food products are stabilized by the incorporation of the food product such that the weight ratio of fructose to fish oil is at least about 0.05:1. Surprisingly, incorporation of modest amounts of fructose in food products within the indicated range provides a stabilizing effect of the highly unstable fish oil. The present invention finds particular suitability for use in connection with fish oils rich in omega-3 fatty acids.

31 Claims, No Drawings

FOOD PRODUCTS CONTAINING FISH OILS STABILIZED WITH FRUCTOSE

BACKGROUND OF THE INVENTION

1. Technical Field

The present invention relates to food products. More particularly, the present invention relates to food products containing fish oils characterized by enhanced flavor stability.

2. Background Art

A great deal of attention has recently been focused on the various health benefits apparently associated with consumption of fish oil. Health benefits appear to be related to the presence of high levels of the n-3 family of polyunsaturated fatty acids. Oils containing such materials, such as fish oils, are referred to as "omega-3" oils and desirably contain high levels of n-3 fatty acids, especially eicosapentaenoic acid ("EPA") and docosahexaenoic acid ("DHA"). Such fatty acids are called "omega-3" since the first double bond occurs in the third carbon bond counting from the end or omega position of the fatty acid.

Notwithstanding the present interest in the health benefits of fish oil consumption, nonhydrogenated fish oil generally to date has not been widely used per se or as an ingredient in processed food products for use by humans due to notorious and severe problems in odor and flavor. However, gelatin capsules containing fish oil are available. Additionally, salmon oil has been added to canned salmon. Also, certain canned meat products have been marketed in Japan which have had refined fish oil added as a fortifier.

Hydrogenated fish oils are much more stable due to the decrease in the degree of polyunsaturation and are widely used in Europe for margarine. Hydrogenated fish oils have also been used in Scandinavian countries in other consumer products, e.g., cakes. Hydrogenation is also effective in reducing odor and flavor that develops in deodorized oil. However, hydrogenation by decreasing polyunsaturation including the n-3 fatty acid component correspondingly decreases the health value of fish oil. Accordingly, it would be desirable to realize a nonhydrogenated fish oil or food products containing such nonhydrogenated fish oils, but nonetheless of increased stability.

The principal approach taken in the art to utilize nonhydrogenated fish oil has been to employ fish oils of enhanced stability. Two broad approaches have been taken in the art to realize nonhydrogenated fish oils of enhanced stability. The first approach involves giving attention to the processing of the oil to achieve a cleaner, finished oil product. Particular attention has been given to the deodorization step in order to realize cleaner finished fish oil products.

In the second approach, the art has attempted to find adjuvants which can be added to finished fish oil to provide desired additional stability. For example, while the phenomenon of fishy flavor dvelopment is not completely understood, it is known, however, that oxidative rancidity is a contributing factor. Addition of known antioxidants, singly as well as commercial mixtures, some allegedly synergistic, does result in some increase in stability. However, the unstability of nonhydrogenated fish oils is so great, that even addition of such materials at maximum legally permitted levels provide only modest increases in stability.

Given the severe difficulties in realizing a suitable fish oil ingredient, it is understandable that comparatively little developmental effort has been made to formulating processed food products containing fish oil.

The prior art also includes U.S. Pat. No. 4,357,362 (issued Nov. 2, 1982 to David Barker). This patent discloses a pet food composition including fish flesh of reduced fishy odor by subjecting the composition in a sealed container, to sterilizing heat in the presence of a reducing agent. However, several disadvantages exist with this approach. First, the primary advantage is a fish odor reduction which is not necessarily directly related to the problems of fish oil flavor degradation. Second, the reduction in aroma is most likely due to the heat treatment in a sealed container. It is undesirable for many foods to be subjected to such severe heat treatment. Third, fish flesh or fish proteinaceous material, an essential ingredient of these pet foods, is known to have a material effect on oil stability. However, many food products, e.g., mayonnaise cannot contain fish flesh, yet could beneficially include fish oil were oil stability nonetheless obtained. Also, the product is less susceptible to oxidative rancidity since it is sealed. Finally, a wide variety of organic and inorganic reducing agents are taught as useful although reducing sugars are preferred.

Given the state of the art with regard to fish oil stabilization, there is a continuing need for the development of new and improved fish oil compositions and processed food products containing fish oil of improved stability.

Accordingly, it is an object of the present invention to provide nonhydrogenated fish oil and food products containing nonhydrogenated fish oils which nonetheless exhibit improved stability against degradation in both flavor and odor.

It is another object of the present invention to provide food products of enhanced stability which do not require heat sterilization.

Another object of the present invention is to provide food products containing fish oil which do not require fish meat.

Still another object of the present invention is to provide food products containing fish oil of enhanced stability against flavor degradation.

It has been most surprisingly discovered that the above objectives can be realized, that long-standing problems associated with employment of fish oils in processed foods have been addressed and food products containing fish oils can be prepared by incorporation of modest amounts of fructose. Surprisingly, fructose alone among sugars and other materials appears to be unexpectedly superior in providing the desired stabilization benefits.

SUMMARY OF THE INVENTION

The present invention relates to food products containing fish oils of enhanced stability. The fish oils and food products comprise refined, deodorized, nonhydrogenated fish oils stabilized with minor amounts of fructose. The food products are free of fish protein or fish flesh.

The present invention also provides stable food emulsions such as salad dressings containing unhydrogenated fish oil and moisture which nonetheless exhibit remarkable stability.

DETAILED DESCRIPTION OF THE INVENTION

The present invention resides in food products containing nonhydrogenated fish oil but which are substantially free of fish flesh. Nonetheless, the present food products are characterized by enhanced oil stability by virtue of the incorporation of minor amounts of fructose.

Throughout the specification and claims, percentages are by weight and temperatures in degrees Fahreheit, unless otherwise indicated.

Fish oils are staples of commerce and their general processing is well known (see, for example, Fish Oils: Their Chemistry, Technology, Stability, Nutritional Propertie, and Uses, ed. by M. E. Stansby, The Avi Publishing Company, Inc. 1967 and which is incorporated by reference). Especially useful for their therapeutic value herein are oils having a total n-3 fatty acid content of greater than about 20% such as are derived from menhaden oil, herring, capelin, anchovy, cod liver, salmon oil, sardine oil and mixtures thereof. Especially preferred for use herein is menhaden oil due to such supply considerations as cost and availability as well as its nutritional quality as being high in omega-3 fats. The fish oils can be conventionally processed, e.g., refined and deodorized, to provide what is referred to in the art as a "finished" oil. Unlike vegetable oils, however, fish oils typically do not require degumming. Also, conventional hydrogenation of the fish oil such as is done to make the oil suitable for use for the preparation of margarine is to be strictly avoided.

The fish oils realized by deodorization and bleaching operations with or without cholesterol removal are generally referred to as "finished oils".

The present invention embraces food products which include fish oil as an ingredient but which do not contain fish composite fish flesh. Thus, the present invention contemplates a wide variety of food products.

Fats and oils, of course, are important ingredients in a wide variety of food products. Fats and oils are desirably added to composite food products for a variety of reasons including their organoleptic, physical and nutritional properties. Vegetable oils comprise the vast bulk of oils employed in composite foods. The present inventions enable fish oils to be used in full or partial substitution for other oils, especially vegetable oils, to obtain not only the conventional organoleptic benefits but also their special nutritional advantages. Thus, the present invention is useful in a wide variety of composite foods. By the term "composite food" or, equivalently, "processed food," it is meant herein any food product in which one or more ingredients are blended or added. Such composite foods will comprise in addition to conventional food ingredients at least 0.1% fish oil and up to about 80% fish oil. In preferred embodiments, the fish oil comprises about 5% to 20%. Even better food products in terms of the special nutritional advantages provided by fish oil are balanced with fish oil stability when the fish oil is present at 10% to 25% of the food product.

It is essential that the present processed food products containing fish oil also contain fructose in order to realize the oil stability advantages discovered herein. It is essential that fructose comprise from about 0.5% to 30% of the product. Of course, insufficient fructose can result in rapid deterioration of quality of the food product. As the oil degrades, the resultant fishy flavor and aroma renders the food product increasingly unpalatable. Excessive fructose levels can result in products characterized by undesirable sweetness without obtaining proportional increases in oil stability, if any. Better results in terms of obtaining oil stabilization benefits without excessive sweetness are obtained when the food products contain about 3% to 15% fructose. Best results are obtained when the processed food products contain about 3% to 8% fructose.

The fructose can be provided from both relatively pure and less pure sources. While pure crystalline fructose of various types and sources are commercially available, fructose in the form of high fructose corn syrup is practical from both a source availability and cost standpoint. Less preferred but nonetheless useful herein are less pure sources of fructose such as other, lower fructose corn syrups, corn syrup, honey, maple syrup solids, fruit juice solids and the like. Also useful are dry high fructose corn syrup solids.

Surprisingly, only fructose has been found to provide the high stabilization benefits of the present invention at the concentrations taught as essential herein. Other reducing agents, whether organic or inorganic have not been found to provide the combined advantages of fructose of stabilization at relatively low levels and without cloying sweetness. Glucose, a closely related sugar, has been found to exhibit some fish oil stabilization activity. However, relative to fructose at the same level, it is much less effective. Xylose has also been found to have some fish oil stabilization activity, but due to its cost, commercial availability and low benefit activity level is not a good substitute for fructose.

In certain instances during development of the present invention, sucrose has ostensibly been shown to give some apparent fish oil stabilization benefits. Upon analysis, however, it is speculated that the appearance of benefits by sucrose derive in fact from fructose resulting from spontaneous hydrolysis of sucrose into glucose and fructose or inversion. Thus sucrose per se is not believed to provide fish oil stabilization but, as surprisingly discovered, only by fructose.

One important group of foods for which the present invention finds particular suitability consists of emulsions comprising water and a triglyceride and, especially stable emulsions which typically additionally comprise an emulsifier including both oil-in-water ("o/w") and water-in-oil ("w/o") emulsion types. The term "stable" is meant to refer to those compositions which exist in emulsion form for extended times rather than quickly breaking down into non-intermixed water and oil phases. Thus, for example, a creamy Italian dressing would constitute a stable emulsion but an ordinary Italian dressing which quickly separates into oil and vinegar would not. Stable emulsions are generally, but not always, characterized by the presence of an emulsifier. Stable emulsions especially exhibit fish oil stability improvement benefits when fructose is present within the defined ranges.

Food grade emulsifiers are well known and the skilled artisan will have no difficulty in selecting particular materials for use herein as an emulsifier. Any one of a number of emulsifiers may be employed including: hydroxylated lecithin, mono-, di-, or polyglycerides of fatty acids, such as monostearin and monopalmitin; polyoxyethylene ethers of fatty esters of polyhydric alcohols, such as the polyoxyethylene ethers of sorbitan monostearate (polysorbate 60 or 80) or the polyoxyethylene ethers of sorbitan distearate; fatty esters of polyhydric alcohols such as sorbitan monostearate; mono- and di-esters of glycols such as propylene glycol monostearate, and propylene glycol monopalmitate, succinoylated monoglycerides; sodium or calcium stearoyl-2-actylate; and the esters of carboxylic acids such as lactic, citric, and tartaric acids with the mono- and diglycerides of fatty acids such as glycerol lactopalmitate and glycerol lactostearate. The fatty acids employed iin the preparation of the emulsifiers include those derived from beef, tallow, and coconut, cottonseed, palm, peanut, soybean and marine oils. Many blends of emulsifiers are commercially used and readily available in accordance with known techniques. For example, it may be desirable to provide a controlled hydrophile-lipophile balance (HLB) as with a lipophilic emulsifier such as glyceryl monostearate or sorbitan monostearate with a hydrophilic material, such as polysorbate 80, while in order formulations, it has been found desirable to simply employ a purified mixture of mono-and diglycerides, i.e., a mixture of glyceryl monostearate and glyceryl distearate. Other emulsifiers can be found in Food Chemicals Codex, 2nd Edition, National Academy of Science, Washington, D.C. 1977 and the supplements thereto under "Emulsifiers, Whipped, and Foaming Agents," page 103. The emulsifiers are used at conventional levels ranging from about 0.1% up to 10% especially when proteins, e.g., egg whites, egg yolks, gelatins, and soy protein isolates are employed.

The present food compositions also essentially include conventional oil stabilizing materials at their maximum permitted levels (e.g., 200 ppm of total oil) such as antioxidants, TBHQ, (tertiary Butyl-hydroquinone) BHA (Butylated Hydroxyamisole) or BHT (Butylated Hydroxytoluene). Not all food approved antioxidants have been shown to help. For example, the use of lecithin has been shown to actually aggravate development of fish flavors. Even more preferred products further include 1 to 2000, preferably 1000 to 2000 and for best results about 2000 ppm tocopherol, in addition to the antioxidant(s). Surprisingly, the combination of TBHQ specifically and vitamin E has unexpectedly been found to be superior to other antioxidants generally considered to be equivalent or substitutes. Still more preferred products include 10 to 150 ppm (based on total oil) preferably 100 to 150 ppm of a chelating agent desirably selected from the group consisting of citric acid, phytic acid, ethylene diamine tetra acetate and mixtures thereof. The food products can also beneficially include about 0.1% to 3% of an oil soluble flavor masking agent, based on the weight of fish oil. Especially useful herein as masking flavor agents are citrus oils such as lemon oil.

The present emulsions can include foods in various temperature related states including frozen, refrigerated or room temperature. The emulsions of any state may be aerated (e.g., 40% to 100% overrun) or non-aerated. Exemplary emulsions of the frozen type can include ice creams, ice milk, milk shakes or other aerated or non-aerated frozen or softserve desserts. Exemplary chilled emulsions include yogurt, margarine and puddings. Exemplary room temperature emulsions include mousse, sauces, snack spreads, processed cheeses and especially salad dressings.

One highly preferred embodiment is a salad dressing with fish oil. Salad dressings typically comprise about 0.1% to 80% by weight oil, preferably about 35% to 60% oil. In less preferred embodiments, the oil component is supplied entirely by fish oil. In more preferred embodiments the oil component comprises a blend of fish oil and vegetable oil(s) due to the added stability benefits of vegetable oil/fish oil blends. In such salad dressings with blends of vegetable and fish oils, the ratio of vegetable to fish oil preferably ranges from about 5 to 2:1, more preferably about 2.5 to 4:1. An essential feature of the present dressing compositions is that the compositions can contain fructose in a weight ration to fish oil ranging from 1 to 100:100, preferably 1 to 30:100.

Salad dressings typically optionally additionally comprise about 0.1% to 15% of an aqueous acidifying agent, The vinegar can be full strength or diluted. Supplemental acidulants can also be employed such as citric and malic acid.

The present salad dressings can also optionally contain minor, but effective amounts of common salad dressing ingredients or flavorings including 0.1% to 5% salt, 0.1% to 40% total nutritive carbohydrate sweeteners when considered in combination with fructose, 0.1% to 20% spices; 0.1% to 3% emulsifiers, including eggs or egg derived ingredients; 0.1% to 20% thickeners such as gums or starchy pastes: sequesterants, e.g., EDTA; 0.1% to 4% tomato solids and 0.1% to 1.0% crystallization inhibitors such as oxystearin, lecithin or polyglycerol esters of fatty acids.

In certain embodiments the salad dressings can additionally comprise about 0.1% to 40%, preferably about 2% to 8% (wet basis) of dairy materials especially cheese materials including for example parmesan, blue cheese, and romano. Certain other embodiments can include about 0.1% to 40% of other dairy products, preferably about 2% to 8%, of a milk product or acidified milk product especially sour cream and/or yogurt and/or buttermilk.

Desirably, all the present food products and emulsions are free of any fish flesh. After conventional blending, the present salad dressings with fish oils stabilized with fructose are desirably packed and in its article aspect, the present invention further resides in hermetically sealed containers or packages, preferably oxygen permeability resistant, e.g., glass, flushed with an inert gas (preferably nitrogen) prior to sealing which contain the present food products. Even with the present advantages of fructose stabilization, the food products with fish oil remain relatively unstable compared to similar compositions based upon more stable vegetable oils. Accordingly, in practice conventional good handling and packaging practices should be employed to minimize heat and oxygen. Refrigerated distribution comparable to that for yogurt is contemplated for the present food products, especially the salad dressings.

Conventional fluid salad dressings are flowable and characterized by viscosities of about 10,000 to 60,000 cp (40° F.) and are further characterized by weight ratios of oil to water ranging from about 0.75 to 1.5:1. However, certain present products are useful not only as salad dressing but also as sandwich spreads. Such compositions are characterized by much higher viscosities, i.e., typically ranging from about 100,000 to 300,000 cp. (40° F.). Such compositions are also generally characterized by higher ratios of oil to water ranging from about 1.5 to 3:1, preferably about 1.5 to 2.5:1.

The present compositions can additionally comprise a variety of optional minor ingredients intended to make the present compositions more nutritious or organoleptically desirable. Such optional components include, for example, vitamins, flavor, colorants, high potency sweeteners (aspartame, saccharine, cyclamates, etc.). If present, such optional ingredients can each comprise about 0.1% to 4% of the composition.

Another preferred optional ingredient is a sweetness perception reducer such as is described in GB No. 2,157,148, especially sodium methoxy phenoxy propanoate, sold as a flavor ingredient under the trade name Lactisole or as is described in EP 207,515 such as an alkali or alkaline earth metal heptyl or octyl sulphonate. If present, such high potency anti-sweeteners are present in amounts ranging from 50 ppm to 1% depending upon such factors as amount of fructose, other sweeteners employed, and potency of anti-sweetener selected. Such materials are especially desirable with those embodiments with high fructose levels which are not traditionally sweet food products.

In certain embodiments the present invention can comprise effective levels of a second sweetening agent, i.e., other than the fructose source, especially nutritive carbohydrate sweetening agents. The second sweetener can be used for its common intended use and at levels sufficient to provide sweetness, bulk, texture or other properties. Common sucrose is the preferred supplemental sweetener. If present, the second nutritive carbohydrate gives good results when comprising from 0.1% to 60% of the food products when combined with the fructose. Of course, high potency sweeteners such as saccharin, cyclamates, aspartame and mixtures thereof can be used in full or partial substitution.

Still another preferred embodiment of the present food products is a yogurt with added fish oil or a "filled" yogurt. The present yogurts preferably comprise in addition to conventional yogurt ingedients about 0.1% to 15% fish oil, more preferably about 3% to 8% and about 2% to 10% fructose, more preferably about 4% to 7%. Other useful food products include margarines, processed cheeses, including cheese sauces and spreads, aerated frozen desserts including fruit based frozen desserts and novelties, and tartar sauce.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure whatsoever. It will be appreciated that other modifications of the present invention, within the skill of those in the food arts, can be undertaken without departing from the spirit and scope of this invention.

EXAMPLE 1

An Italian dressing food emulsion of the present invention was prepared having the following formulation:

| Ingredient | Weight % |
| --- | --- |
| Sunflower oil | 45.2825 |
| Buttermilk, cultured | 22.82 |
| Vinegar, 100 grain | 10.73 |
| Fish oil[1] | 10.66 |
| High fructose corn syrup (72% fructose dry basis) | 6.59 |
| Salt | 1.75 |
| Spices | |
| Garlic, powdered | 0.56 |
| Mustard, ground | 0.43 |
| Onion, minced, dry | 0.36 |
| Pepper granules, dried red | 0.09 |
| Xanthan gum | 0.20 |

| Ingredient | Weight % |
| --- | --- |
| Polysorbate 60 | 0.14 |
| Sorbitan monostearate | 0.06 |
| Antioxidant blend[2] | 0.18 |
| Pepper, black, coarse grd. | 0.13 |
| Calcium di Na EDTA | 0.0075 |
| Lemon oil, natural | 0.01 |
| | 100.0000% |

[1] A refined and deodorized menhaden oil.
[2] Antioxidant blend consisting of 60% tocopherol available from Henkel Corporation under the trade name Covi-OX T70, 30% TBHQ mixture of (32% glycerol monoleate, 30% corn oil, 20% TBHQ, 15% prophylene glycol and 3% citric acid) available from Eastman Chemical Products Inc. under the trade name TENOX 20A. 10% partially hydrogenated soybean oil with BHA to help protect flavor available from Durkee Industrial Foods, under the trade name Durkex 100.

The above formulation was prepared according to the following procedure:

1. Admix water with polysorbate 60, calcium EDTA, sorbitan monosterate, HFCS in blender.
2. Slowly add all dries while blender is at a low speed.
3. Slowly add oils and antioxidant blend and emulsifier. (Blender speed will need to be increased.) Continue blending until well emulsified.
4. Add vinegar.

The above formulation exhibited good stability against fish oil deterioration for up to 16 weeks refrigerated storage at 40° F. (5° C.).

Salad dressings having comparable organoleptic attributes and stability are realized when in the above formulation the sunflower oil is replaced with an equivalent amount of other vegetable oil(s) such as soybean oil, rapeseed oil, corn, safflower and mixtures thereof.

EXAMPLE 2

A French dressing type food emulsion of the present invention was prepared having the following formulation:

| Ingredient | Weight g | Weight % |
| --- | --- | --- |
| Sunflower oil | 29.01 | 34.5525 |
| Seasoning blend | 16.60 | 19.75 |
| Menhaden fish oil | 10.67 | 12.70 |
| Tomato paste (31% solids) | 10.00 | 11.90 |
| Vinegar, 100 grain | 9.00 | 10.71 |
| High fructose corn syrup | 4.50 | 5.35 |
| Honey | 3.70 | 4.40 |
| Lemon juice | 0.30 | 0.36 |
| Kelcoloid DSF (thickener) | 0.08 | 0.10 |
| Antioxidant blend[1] | 0.16 | 0.16 |
| Calcium EDTA | 0.01 | 0.0075 |
| Lemon oil, natural | 0.01 | 0.01 |
| | 84.04 g | 100.0000% |

[1] Antioxidant blend consisting of 60% tocopherol available from Henkel Corporation under the trade name Covi-OX T70, 30% TBHQ mixture of (32% glycerol monoleate, 30% corn oil, 20% TBHQ, 15% prophylene glycol and 3% citric acid) available from Eastman Chemical Products Inc. under the trade name TENOX 20A. 10% partially hydrogenated soybean oil with BHA to help protect flavor available from Durkee Industrial Foods, under the trade name Durkex 100.

The above formulation was prepared into a salad dressing in a manner similar to that described in Example 1.

Salad dressings having comparable organoleptic attributes and stability are realized when in the above formulation the menhaden oil is replaced with an equivalent amount of refined and deodorized fish oils such as sardine oil, herring oil, cod-liver oil, salmon oil and mixtures thereof.

The above formulation exhibited good stability against fish oil deterioration for up to 16 weeks refrigerated storage at 40° F. (5° C.).

EXAMPLE 3

A blue cheese dressing food emulsion of the present invention was prepared having the following formulation:

| Ingredient | Weight % |
| --- | --- |
| Sunflower oil | 40.3925 |
| Buttermilk, cultured | 19.61 |
| Blue cheese, crumbled | 14.67 |
| Fish oil | 10.66 |
| High fructose corn syrup | 4.08 |
| Vinegar, 100 grain | 5.66 |
| Salt | 0.91 |
| Spices and flavor | |
| Onion, minced, dry | 0.84 |
| Garlic, powdered | 0.80 |
| Blue cheese flavor | 0.55 |
| Mustard, ground | 0.40 |
| Milk, non-fat | 0.50 |
| Lemon juice | 0.45 |
| Xanthan gum | 0.15 |
| Emulsifier[1] | 0.14 |
| Antioxidant blend[2] | 0.17 |
| Calcium EDTA | 0.0075 |
| Lemon oil | 0.01 |
| | 100.0000% |

[1]Polyoxyethylene (60) sorbitan monostearate.
[2]Antioxidant blend consisting of 60% tocopherol available from Henkel Corporation under the trade name Covi-OX T70. 30% TBHQ mixture of (32% glycerol monoleate, 30% corn oil, 20% TBHQ, 15% propylene glycol and 3% citric acid) available from Eastman Chemical Products Inc. under the trade name TENOX 20A. 10% partially hydrogenated soybean oil with BHA to help protect flavor available from Durkee Industrial Foods, under the trade name Durkex 100.

The above formulation was prepared into a salad dressing in a manner similar to that described in Example 1.

The above formulation exhibited good stability against fish oil deterioration for up to 16 weeks refrigerated storage at 40° F. (5° C.).

EXAMPLE 4

A thousand island type dressing food emulsion of the present invention was prepared having the following formulation:

| Ingredient | Weight % |
| --- | --- |
| Sunflower oil | 35.9925 |
| High fructose corn syrup | 12.34 |
| Fish oil | 10.67 |
| Vinegar, 100 grain | 9.58 |
| Distilled water | 9.05 |
| Acidified, diced cucumber | 7.01 |
| Tomato paste (31% solids) | 6.00 |
| Buttermilk, cultured | 3.46 |
| Sucrose | 2.61 |
| Salt | 2.02 |
| Mustard, ground | 0.50 |
| Polysorbate 60 | 0.14 |
| Pickling spice | 0.14 |
| Garlic, powdered | 0.12 |
| Xanthan gum | 0.12 |
| Sorbitan monostearate | 0.06 |
| Onion, powdered, dried | 0.02 |
| Antioxidant blend | 0.15 |
| Calcium EDTA | 0.0075 |
| Lemon oil, natural | 0.01 |
| | 100.0000% |

The above formulation was prepared into a salad dressing in a manner similar to that described in Example 1.

The above formulation exhibited good stability against fish oil deterioration for up to 16 weeks refrigerated storage at 40° F. (5° C.).

EXAMPLE 5

A reduced calorie, reduced oil content blue cheese type dressing food emulsion of the present invention was prepared having the following formulation:

| Ingredient | Weight % |
| --- | --- |
| Buttermilk, cultured | 31.0125 |
| Sour cream, low fat | 16.45 |
| Fish oil | 10.66 |
| Distilled water | 10.52 |
| Blue cheese, crumbled | 10.00 |
| Sunflower oil | 9.39 |
| Corn syrup | 4.50 |
| Vinegar, 100 grain | 3.40 |
| Salt | 1.20 |
| Onion, minced, dry | 0.60 |
| Blue cheese flavor | 0.55 |
| Mustard, ground | 0.50 |
| Lactic acid 88% | 0.35 |
| Onion, powdered, dried | 0.18 |
| Xanthan gum | 0.18 |
| Kelcoloid LVF[1] | 0.15 |
| Polysorbate 60 | 0.14 |
| Garlic, powdered | 0.08 |
| Sorbitan monostearate | 0.06 |
| Antioxidant blend | 0.07 |
| Calcium EDTA | 0.0075 |
| Lemon oil | 0.01 |
| | 100.0000% |

[1]A blend of propylene glycol alginate type gums available from Kelco (Division of Merck & Co., Inc.) under the trade name Kelcoloid LVF.

EXAMPLE 6

A filled yogurt food emulsion of the present invention was prepared having the following formulation:

| Ingredient | Weight % |
| --- | --- |
| Antioxidant blend | 0.03 |
| Whole milk | 64.57 |
| Skim milk | 5.37 |
| Fish oil | 8.62 |
| Culture | 5.00 |
| NFDM | 4.62 |
| Sucrose | 8.90 |
| Gelatin | 0.31 |
| Agar | 0.18 |
| Fructose | 2.40 |
| | 100.00% |

The above yogurt is prepared by pasteurizing a blend of the ingredients except the fish oil, innoculating with a yogurt culture and maintaining the innoculated culture at 110° F. for 3-4 hours, then cooled and homogenized. Thereafter, the fish oil is blended into the yogurt and the yogurt is refrigerated and allowed to set.

A filled yogurt composition was prepared by admixing 100 g of Yoplait brand plain, low fat yogurt in a small blender with 88.2 g of deodorized menhaden oil at medium speed. Thereafter, 32 g of the above mixture was added by hand mixing to a second, 138 portion of yogurt with 4 g of high fructose corn syrup.

EXAMPLE 7

A mayonnaise type salad dressing of the present invention was prepared having the following formulation:

| Ingredient | Weight % |
| --- | --- |
| Antioxidant blend | 0.27 |
| Cider vinegar | 2.00 |
| Egg yolk (10% salt) | 5.50 |
| Water | 5.80 |
| 100 grain vinegar | 2.60 |
| HFCS | 1.40 |
| Salt | 1.29 |
| Durkex 25[1] | 56.4245 |
| Deodorized fish oil[2] | 23.50 |
| Lemon juice | 1.20 |
| Mustard flour | 0.10 |
| Garlic | 0.005 |
| Onion | 0.003 |
| Calcium EDTA | 0.0075 |
| | 100.0000% |

[1] A partially hydrogenated soybean oil available from Durkee Industrial Foods.
[2] Having about 2000 ppm tocopherol, 30 ppm citric acid, and 200 ppm TBHQ.

EXAMPLE 8

A tartar sauce food emulsion of the present invention was prepared having the following formulation:

| Ingredient | Weight % |
| --- | --- |
| Chopped onion | 5.79 |
| Gedney's brand dill relish | 17.36 |
| 42 DE corn syrup solids | 4.67 |
| Mayonnaise (from Example 7) | 48.90 |
| Starch | 1.97 |
| Water | 20.94 |
| Seasoning blend[1] | 0.37 |
| | 100.00% |

[1] A seasoning blend available from McCormick Dodge, Inc. under the trade designation SC-172-24.

EXAMPLE 9

A margarine food emulsion of the present invention was prepared having the following formulation:

| Ingredient | Weight % |
| --- | --- |
| Antioxidant blend | 0.06 |
| Cirol vegetable oil[1] | 48.80 |
| Durkex 500 vegetable oil[2] | 9.20 |
| Deodorized fish oil[3] | 18.60 |
| High fructose corn syrup 90 | 1.00 |
| Myverol 18-92 emulsifier[4] | 0.56 |
| Myverol 18-00 emulsifier[5] | 0.19 |
| Flavor | 0.14 |
| Salt | 2.00 |
| Distilled water | 19.45 |
| | 100.00% |

[1] A partially hydrogenated vegetable oil (cottonseed, soybean) available from Durkee Industrial Foods under the trademark Cirol.
[2] A partially hydrogenated vegetable oil (cottonseed, soybean) available from Durkee Industrial Foods under the trademark Durkex 500.
[3] A deodorized menhaden oil having 2000 ppm tocopherol and 200 ppm TBHQ.
[4] Distilled monoglycerides available from Durkee Industrial Foods under the trademark Myverol 18-92.
[5] Distilled monoglycerides available from Durkee Industrial Foods under the trademark Myverol 18-00.

The margarine was prepared by combining the ingredients as follows:
1. Mix all oil soluble ingredients together, except fish oil. Dissolve salt into the water.
2. Heat oil soluble ingredients until melted.
3. When oil soluble ingredients melted, add fish oil and water/salt solution.
4. Stir constantly in a water ice bath until begins to thicken and crystallize.

EXAMPLE 10

A processed cheese food emulsion of the present invention is prepared having the following formulation:

| Ingredient | Weight % |
| --- | --- |
| Antioxidant blend | 0.04 |
| Butter | 11.50 |
| Fish oil[1] | 11.50 |
| Flavors | |
| Cheese flavor | 0.08 |
| Butter flavors | 0.16 |
| Skim milk cheese | 26.62 |
| Cheddar cheese | 36.00 |
| Water | 8.90 |
| Na$_2$PO$_4$ | 2.70 |
| Na$_3$PO$_4$ | 0.30 |
| Color | 0.05 |
| Annatto | 0.05 |
| Potassium sorbate | 0.10 |
| Fructose | 2.00 |
| | 100.00% |

[1] A deodorized menhaden oil having 2000 ppm tocopherol and 200 ppm TBHQ.

The processed cheese is prepared by the following:
1. Melt cheese in steam jacketed Hobart mixing kettle with steam.
2. Add water and phosphates. Mix 2-4 minutes.
3. Add fish oil, butter, colors, flavors.
4. Mix until oilless plastic mass forms.
5. Package and store at 35° F.

EXAMPLE 11

An aerated frozen fruit dessert of the present invention is prepared having the following formulation:

| Ingredient | Weight % |
| --- | --- |
| Antioxidant blend | 0.02 |
| Strawberries | 37.29 |
| Water | 26.63 |
| Corn syrup (42% fructose) | 1.54 |
| Whipping aid | 0.70 |
| Thickener/Stabilizer[1] | 0.271 |
| Sucrose | 23.23 |
| Maltodextrin | 4.56 |
| Deodorized fish oil | 5.90 |
| Flavor | 0.189 |
| | 99.67% |

The above dessert is prepared as follows:
1. Blend dry ingredients.
2. Cut and deseed strawberries.
3. Add strawberries, water, and corn syrup to blender and mix in dries with wire whip.
4. Mix in fish oil.
5. Mixture is then heated to 105° F. in steam kettle.
6. Homogenized @ psi.
7. Agitate and freeze in conventional ice cream maker and store @ 0° F.

EXAMPLE 12

A variety of white sauce emulsions were prepared to compare the efficacy of fructose with other materials.

|  | A | B-F |
| --- | --- | --- |
| Water | 86.833 | 83.833 |
| Mod. food starch | 2.65 | 2.65 |
| Regular flour | 3.54 | 3.54 |
| Salt | 0.71 | 0.71 |
| Fish oil | 5.29 | 5.29 |
| Antioxidant blend | 0.02 | 0.02 |
| Disodium phosphate | 0.95 | 0.95 |
| Calcium EDTA | 0.007 | 0.007 |
| B. Fructose | — | 3.00 |
| C. Sucrose | — | 3.00 |
| D. Maltodextrin | — | 3.00 |
| E. Glucose | — | 3.00 |
| F. Xylose | — | 3.00 |

In the above formulation, Sample A does not contain a sugar. Sample B is a composition according to the present invention as it contains fructose. Samples C–F are similar to Sample B except that other sugars are substituted for fructose.

The above samples were each prepared first preparing a pre-mix of the dried ingredients. Thereafter water was slowly added and the mixture was cooked at 170° to 180° F. for 3 minutes. Next, the fish oil was admixed and the white sauce so formed, cooled, packed in boil in the bag pouches (2 oz. product) and stored at 0° F.

The sauces were evaluated for development of fish flavor at weekly intervals by a panel of 3–4 persons, with the same persons at each session. The individual pouches were placed in boiling water and cooked for four minutes, the contents of the package was removed and the sauces cooled to 95° to 100° F., the temperature at which they were evaluated.

After 12 weeks of storage at 0° F., all samples except the fructose sample, were judged to be unacceptable due to moderate to extreme fishy flavor. The fructose sample was judged acceptable and had no fishy flavor.

EXAMPLE 13

A cheese sauce food product of the present invention with fish oil was prepared having the following formulation (Sample 1) and was compared with a similar composition but not containing fructose (Sample 2).

| Ingredient | Sample 1 Weight % | Sample 2 Weight % |
| --- | --- | --- |
| Whole milk | 67.1025 | 64.1025 |
| Cheddar cheese | 20.0000 | 20.00 |
| Deodorized fish oil | 4.635 | 4.635 |
| Antioxidant blend | 0.015 | 0.015 |
| HFCS (72% fructose) | 0.00 | 3.00 |
| Regular flour | 3.00 | 3.00 |
| Mod. food starch | 3.00 | 3.00 |
| Butter | 0.50 | 0.50 |
| Salt | 0.70 | 0.70 |
| Ground mustard | 0.10 | 0.10 |
| Powdered garlic | 0.10 | 0.10 |
| Powdered onion | 0.10 | 0.10 |
| Hydrolyzed vegetable protein | 0.06 | 0.06 |
| Butter flavor | 0.02 | 0.02 |
| Disodium phosphate | 0.50 | 0.50 |
| Worchestershire sauce | 0.16 | 0.16 |
| Calcium EDTA | 0.0075 | 0.0075 |
|  | 100.0000% | 100.0000% |

The above dressings were prepared by the following procedure:
1. Mix dries.
2. Melt butter in pan, make paste with dries, slowly add milk and worchestershire sauce.
3. Add cheese and stir until melted.
4. Heat to above 170° to 180° F. and hold for 10 minutes.
5. Add fish oil, mix well, allow to cool.
6. Package in 2 oz. boil in the bag pouches.
7. Store at 0° F.

The samples were evaluated every 4 weeks by a panel of the same 2–4 persons at each session. The pouches were boiled in water for 4 minutes and the sauce was then removed from the pouch and cooled to 95° to 100° F., the evaluation temperature of the sauces. After 8 weeks storage at 0° F., the sample with fructose had no fishy flavor and was judged to be acceptable. The sample with no fructose had strong fishy flavor and was judged to be unacceptable.

EXAMPLE 14

A creamy Italian salad dressing of the present invention with fructose and fish oil was prepared (Sample 1) and was compared with similar composition but not containing fructose (Sample 2):

| Ingredient | Sample 1 | Sample 2 |
| --- | --- | --- |
| Water | 34.06 g | 39.06 g |
| Potassium sorbate | 0.10 | 0.10 |
| Calcium EDTA | 0.005 | 0.005 |
| HFCS 90 | 5.00 | 0.00 |
| Na Acetate | 0.24 | 0.25 |
| Durkex 25 | 25.80 | 25.80 |
| Fish oil | 14.15 | 14.15 |
| Antioxidant blend[1] | 0.05 | 0.05 |
| Polysorbate 80[2] | 0.30 | 0.30 |
| Spice blend | 2.30 | 2.30 |
| Sugar | 6.00 | 6.00 |
| Salt | 3.00 | 3.00 |
| Xanthan gum | 0.50 | 0.50 |
| Vinegar, 100 grain | 13.50 | 13.50 |

[1]Per Example 1.
[2]Polysorbate 80 emulsifiers available from Durkee Foods Division of SCM Corp. available under the trade name Durfax 80.

The formulations were prepared as described in Example 1. The samples were stored in 1 oz. screw-cap type glass jars at room temperature (70° to 73° F.).

The samples were evaluated for fishy flavor at 4 week intervals by the same 2–4 person task panel. After 13 weeks storage at room temperature, the sample with fructose had no fishy flavor and was judged to be acceptable. The sample without fructose had moderate fish flavor and was judged to be unacceptable.

The invention may be embodied in other specific forms without departing from the spirit or essential characteristics thereof. The present embodiments are therefore to be considered in all respects as illustrative and not restrictive. The scope of the invention being indicated by the appended claims rather than by the foregoing description, and all changes which come within the meaning and range of equivalency of the claims are therefore intended to be embraced therein.

What is claimed is:

1. A food product containing fish oil exhibiting enhanced stability and extended shelf life against fish oil flavor degradation without heat treatment, comprising:
   A. about 0.1% to 80% by weight of the food product of a deodorized nonhydrogenated fish oil,
   said fish oil containing
   (1) about 150 to 200 ppm of a fish oil stabilizing antioxidant (2) about 1500–2000 ppm tocopherol;
B. about 0.5% to 30% by weight of the food product of fructose; and
wherein said food product is substantially free of fish flesh.

2. The food product of claim 1, additionally comprising:
C. a moisture containing ingredient; and
D. sufficient stabilizer to form an emulsion, and wherein the food product is a stable emulsion.

3. The food product of claim 2, wherein the emulsion is of the oil-in-water type, and wherein moisture comprises about 20% to 80% by weight of the product.

4. The food product of claim 3 wherein the emulsion is of a salad dressing type and wherein the moisture containing ingredient is vinegar.

5. The food product of claim 4, additionally comprising:
E. a vegetable oil containing at least 100 ppm antioxidant, and
wherein the weight ratio of fish oil to vegetable oil ranges from about 1:2 to 5.

6. The food product of claim 5 wherein the fish oil comprises about 8% to 15% by weight of the product.

7. The food product of claim 6 wherein the antioxidant is selected from the group consisting of TBHQ, BHA, BHT and mixtures thereof.

8. The food product of claim 7 additionally comprising a chelating agent.

9. The food product of claim 8 additionally comprising an oil soluble flavor masking agent.

10. The food product of claim 9, additionally comprising:
F. a second nutritive carbohydrate sweetening agent, and wherein the combined percentage with fructose ranges from about 0.6% to 60% of the composition.

11. The food product of claim 10 wherein the flavor masking agent is a citrus oil.

12. The food product of claim 11 wherein the weight ratio of fructose to fish oil ranges from about 1 to 100:100.

13. The food product of claim 12 wherein fructose comprises about 3% to 15% by weight of the product.

14. The food product of claim 13, additionally comprising: G. about 1% to 8% by weight of a dairy component.

15. The product of claim 14 wherein the dairy component is selected from the group consisting of cheese, yogurt, sour cream and mixtures thereof.

16. The food product of claim 15 wherein the flavor masking agent includes about 200 to 2000 ppm of lemon oil.

17. The food product of claim 16 wherein the fish oil includes about 50 to 75 ppm of chelating agent.

18. The food product of claim 1, 2, 3, 4, 5, 6, 7, 8, 9, 10, 11, 12 or 13 wherein the food product is a mayonnaise.

19. The food product of claim 1, 2, or 3 wherein the food about 3% to 15% by weight of the product.

20. The food product of claim 19 wherein the antioxidant is TBHQ.

21. The food product of claim 3 wherein the moisture containing ingredient is a dairy component.

22. The food product of claim 21 additionally comprising about 30% to 70% by weight of a dairy component.

23. The food product of claim 22 wherein the food product is a yogurt.

24. The food product of claim 22 wherein the weight ratio of fructose to fish oil ranges from about 1 to 100:100.

25. The food product of claim 23 wherein fructose comprises about 3% to 15% by weight of the product.

26. The food product of claim 1, 2, 3, 21, 22, or 23 wherein the emulsion is aerated.

27. The food product of claim 22 or 23 wherein the food product is frozen.

28. The food product of claim 27 wherein the food product is ice cream.

29. The food product of claim 13, 14, 15, 17, 21, 22, 23, 24 or 25 wherein the antioxidant is TBHQ.

30. A food product containing fish oil exhibiting enhanced stability and extended shelf life against fish oil flavor degradation without heat treatment consisting essentially of:
A. about 0.1% to 80% by weight of the food product comprising an oil component, of which all or a portion is a deodorized, nonhydrogenated fish oil containing:
(1) about 150 to 200 ppm of a fish oil stabilizing antioxidant and
(2) about 1500–2000 ppm tocopherol;
B. a sugar component, of which all or a portion is fructose such that about 0.5% to 30% by weight of such food product is fructose;
C. water;
D. a protein component; and
E. an emulsifier to maintain the food product in an emulsion.

31. A food product containing fish oil exhibiting enhanced stability and extended shelf life against fish oil flavor degradation without heat treatment consisting essentially of:
A. about 0.1% by weight of the food product comprising an oil component, of which all or a portion is a deodorized, nonhydrogenated fish oil containing:
(1) about 150 to 200 ppm of a fish oil stabilizing antioxidant and
(2) about 1500–2000 ppm tocopherol;
B. a sugar component, of wich all or a portion is fructose such that about 0.5% to 30% by weight of such food product is fructose;
C. water; and
D. a protein component.

* * * * *

UNITED STATES PATENT AND TRADEMARK OFFICE
CERTIFICATE OF CORRECTION

PATENT NO. : 4,913,921

DATED : April 3, 1990

INVENTOR(S) : Lisa R. Schroeder, et al.

It is certified that error appears in the above-identified patent and that said Letters Patent is hereby corrected as shown below:

In column 5, line 5, delete "actylate" and insert --lactylate--.

In column 5, line 9, delete "iin" and insert --in--.

In column 16, line 2, delete "about 3% to 15% by weight of the product" and insert --product is a margarine--.

Signed and Sealed this

Tenth Day of December, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,913,921
DATED : April 3, 1990
INVENTOR(S) : Lisa R. SCHROEDER et al.

It is certified that error appears in the above-indentified patent and that said Letters Patent is hereby corrected as shown below:

Column 16, line 2, delete "about 3% to 15% by weight of the product" and insert --product is a margarine--.

Signed and Sealed this

Twelfth Day of December, 1995

Attest:

BRUCE LEHMAN

Attesting Officer    Commissioner of Patents and Trademarks